Nov. 3, 1931.  W. W. SLOANE  1,829,764

CONDUIT TERMINAL

Filed March 6, 1929

Inventor
William W Sloane
Clarence G. Poole
Attorney

Patented Nov. 3, 1931

1,829,764

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CONDUIT TERMINAL

Application filed March 6, 1929. Serial No. 344,647.

The invention relates particularly to electrical conductor conduit terminals, and has particular relation to explosion proof electrical installations such as are used in underground mining, although not limited to this use alone.

The invention relates more particularly to a simple, effective, rugged and conveniently assembled conduit terminal which is preferably associated with an enclosure outlet provided with a packing device including a screwthreaded packing member and utilizes the packing member for securing the conduit terminal, the terminal preferably preventing turning of the conduit and providing a continuous enclosure, all with a view particularly toward explosion proof electrical installations aforementioned.

The invention will be better understood by reference to the accompanying drawings in which.

Like characters of reference indicate like parts in the several views.

Figure 1:
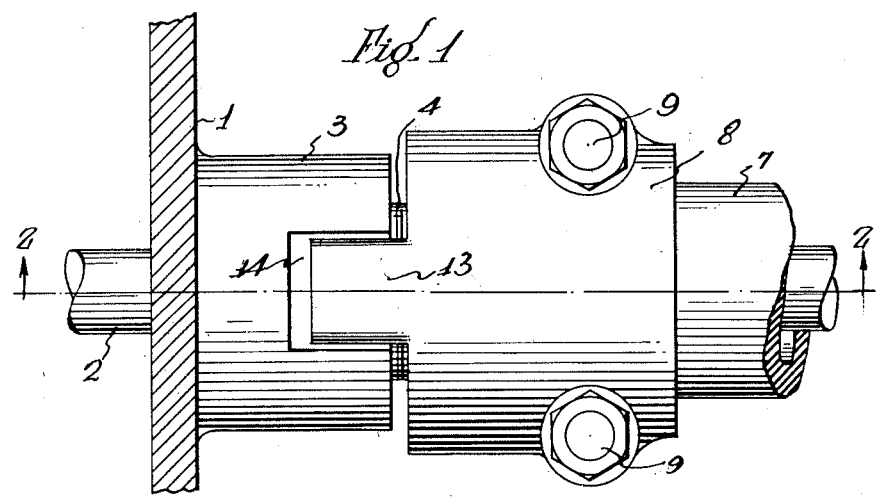
Figure 1 is a plan view of a conduit terminal embodying my invention.
Figure 2:
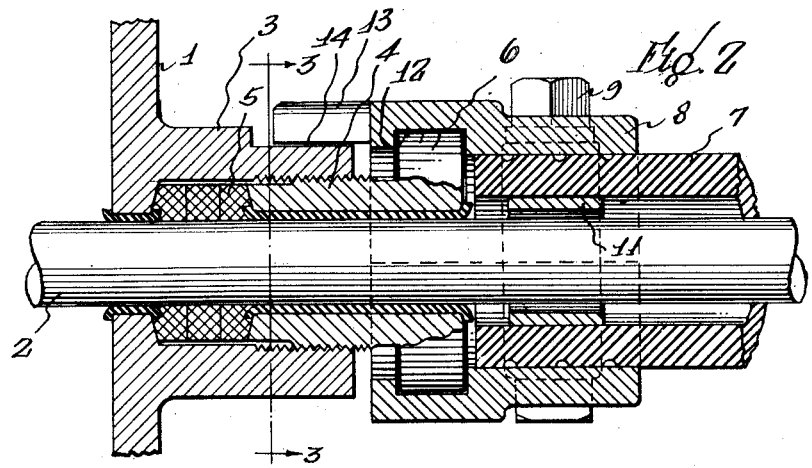
Figure 2 is a longitudinal section of the same on the line 2—2 of Figure 1.
Figure 3:
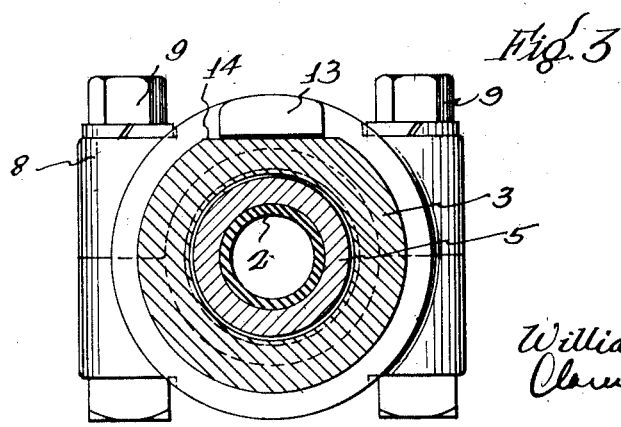
Figure 3 is a section on the line 3—3 of Figure 2.

Referring to the drawings, 1 designates an enclosure which is provided with an outlet aperture through which extends an insulated electrical conductor 2. The enclosure is provided with an exterior boss 3 surrounding said aperture, and the aperture is enlarged from the outer end thereof to provide a stuffing box into which is screwthreaded a packing member 4 to compress packing 5 within the stuffing box upon the conductor 2. See particularly Figure 2. The packing member 4 is provided with an exterior annular flange 6 at its outer end, as is usual.

Outwardly of the enclosure 1 and packing device the conductor 2 is enclosed within a conduit 7 such as heavy reinforced rubber tubing.

A split clamp collar comprising complemental semicircular members 8 clamped together by bolts 9 is clamped upon the end of the conduit 7, a metal sleeve 11 on the inside of the conduit serving to strengthen the conduit at the clamped portion thereof.

The clamp collar extends outwardly beyond the end of the conduit 7, and this portion of the collar is provided with an interior annular groove 12 which is engageable over the flange 6 to axially fix the clamp collar with the packing member 4 and thus secure the end of the conduit.

In order to fix the clamp collar angularly with the enclosure 1, one of the clamp members 8 is provided with an axially extending projection 13 which engages a flattened portion 14 of the boss 3.

While I have shown and described one form in which my invention may be embodied, it will be understood that the arrangement or construction of the various parts may be altered or changed without departing from the spirit or scope of the invention. Furthermore, I do not wish to be construed as limiting myself to the specific embodiment illustrated, except as it may be limited by the appended claims.

I claim as my invention:

1. In a device of the character described, the combination with an apertured part, of a packing device associated with the aperture of said part including a packing member screwthreaded into said aperture and provided with an exterior annular flange, a split clamp collar for clamping upon a conduit and provided with an interior annular groove engageable on said flange to axially fix said collar and packing member, and an engagement between said collar and said apertured part for angularly fixing said collar and said apertured part.

2. In a device of the character described, the combination with an apertured part having a boss surrounding said aperture, of a packing device associated with the aperture of said part including a packing member screwthreaded into said aperture at said boss and projecting outwardly therefrom and provided with an exterior annular flange at its outer end, a split clamp collar for clamping upon a conduit and provided with an interior annular groove engageable on said flange to axially fix said collar and packing member, and an axially extending projection on said collar and engageable with a suitable formation on said boss for angularly fixing said collar and said apertured part.

3. In a device of the character described, the combination with an apertured part, of an electrical conduit extending through said apertured part, a packing device associated with the aperture of said part and interposed between said apertured part and said electrical conduit including a packing member screw threaded into said aperture and provided with an exterior annular flange, a conduit forwardly of said packing member surrounding said electrical conduit, a split clamp collar for clamping upon said conduit and provided with an interior annular groove engageable on said flange to axially fix said collar and packing member, and an engagement between said collar and said apertured part for angularly fixing said collar and said apertured part.

4. In a device of the character described, the combination with an apertured part having a boss surrounding said aperture, of an electrical conduit extending through said apertured part, a packing device associated with the aperture of said part and interposed between said apertured part and said electrical conduit including a packing member screw threaded into said aperture at said boss and projecting outwardly therefrom and provided with an exterior annular flange at its outer end, a conduit forwardly of said packing member surrounding said electrical conduit, a split clamp collar for clamping upon said conduit and provided with an interior annular groove engageable on said flange to axially fix said collar and packing member, and an axially extending projection on said collar and engageable with a suitable formation on said boss for angularly fixing said collar and said apertured part.

Signed at Chicago, in the county of Cook and State of Illinois, this 28th day of February, A. D. 1929.

WILLIAM W. SLOANE.